(12) United States Patent
Wallis

(10) Patent No.: US 9,107,507 B2
(45) Date of Patent: Aug. 18, 2015

(54) ADJUSTABLE TELESCOPING ARM

(71) Applicant: FLEXSTEEL INDUSTRIES, INC., Dubuque, IA (US)

(72) Inventor: David E. Wallis, Dubuque, IA (US)

(73) Assignee: FLEXSTEEL INDUSTRIES, INC., Dubuque, IA (US)

( * ) Notice: Subject to any disclaimer, the term of this patent is extended or adjusted under 35 U.S.C. 154(b) by 235 days.

(21) Appl. No.: 13/675,731

(22) Filed: Nov. 13, 2012

(65) Prior Publication Data

US 2013/0119738 A1 May 16, 2013

Related U.S. Application Data

(60) Provisional application No. 61/558,809, filed on Nov. 11, 2011.

(51) Int. Cl.
| | | |
|---|---|---|
| *A47C 7/54* | (2006.01) | |
| *A47C 1/03* | (2006.01) | |
| *B60N 2/46* | (2006.01) | |
| *A61G 5/12* | (2006.01) | |

(52) U.S. Cl.
CPC ... *A47C 7/54* (2013.01); *A47C 1/03* (2013.01); *A47C 7/543* (2013.01); *A61G 5/12* (2013.01); *B60N 2/464* (2013.01); *A61G 2005/125* (2013.01)

(58) Field of Classification Search
CPC ..................................... A47C 1/03; A47C 7/54
USPC ....................................................... 297/411.36
See application file for complete search history.

(56) References Cited

U.S. PATENT DOCUMENTS

| | | | | | |
|---|---|---|---|---|---|
| 2,955,648 | A | * | 10/1960 | Krajewski | 297/411.3 |
| 3,679,257 | A | * | 7/1972 | Jacuzzi et al. | 297/42 |
| 3,779,600 | A | * | 12/1973 | Quakenbush | 297/411.3 |
| 4,877,287 | A | * | 10/1989 | Escaravage | 297/411.36 |
| 5,636,899 | A | * | 6/1997 | Schiff et al. | 297/411.36 |
| 5,795,025 | A | * | 8/1998 | Murphy | 297/411.36 |
| 5,823,976 | A | * | 10/1998 | Cain et al. | 601/23 |
| 5,997,092 | A | * | 12/1999 | Slaven | 297/411.36 |
| 6,286,793 | B1 | * | 9/2001 | Hirose et al. | 248/118 |
| 7,387,342 | B1 | * | 6/2008 | Clough et al. | 297/411.36 |
| 7,517,010 | B2 | * | 4/2009 | Saint-Jalmes et al. | 297/118 |
| 8,419,124 | B2 | * | 4/2013 | Kramer et al. | 297/173 |

* cited by examiner

*Primary Examiner* — David R Dunn
*Assistant Examiner* — Tania Abraham
(74) *Attorney, Agent, or Firm* — Ladas & Parry LLP

(57) ABSTRACT

An arm assembly with an arm, a plurality of vertical support members and a horizontal member is telescopingly mounted in a housing, such that the arm assembly moves vertically by movement of a scissors mechanism having slidable pivot mountings, whereby movement of a linear actuator at the bottom of the housing translates horizontal movement to vertical movement, which vertical movement is imparted upwardly by a spring and downwardly against the spring, the vertical movement being controlled by a lever and cable actuated lock.

13 Claims, 3 Drawing Sheets

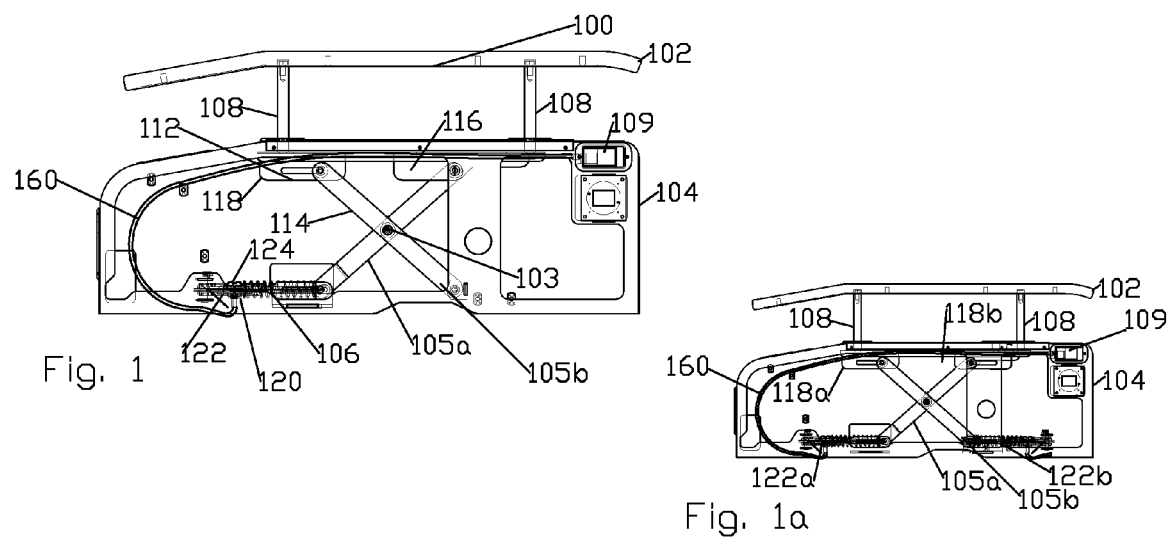
Fig. 1
Fig. 1a
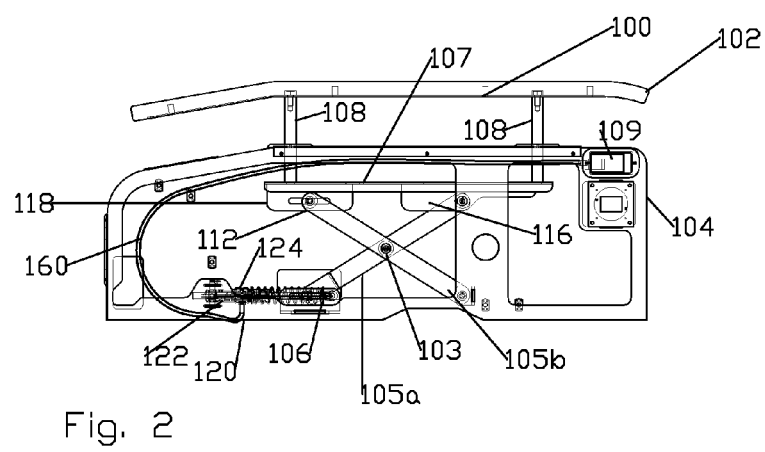
Fig. 2
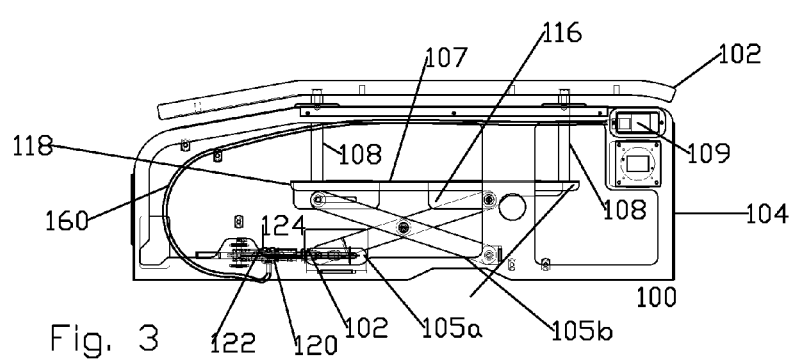
Fig. 3

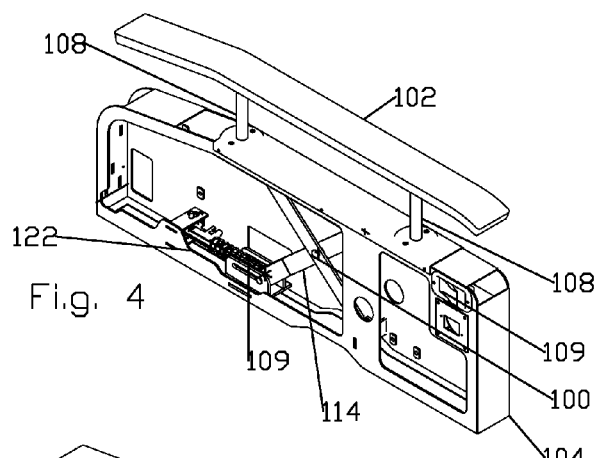
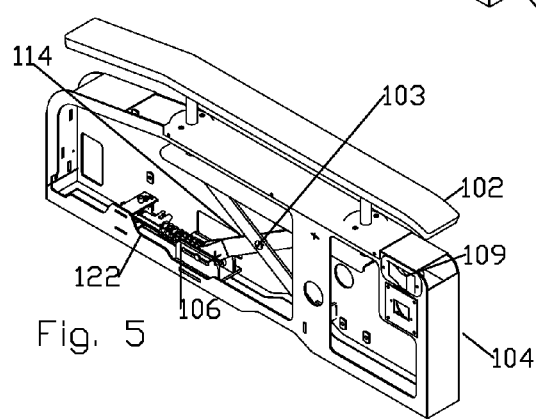
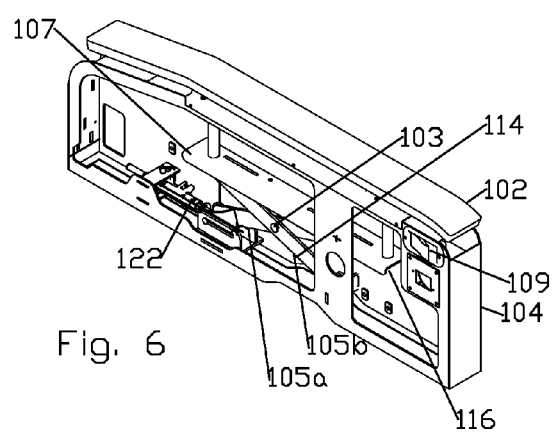
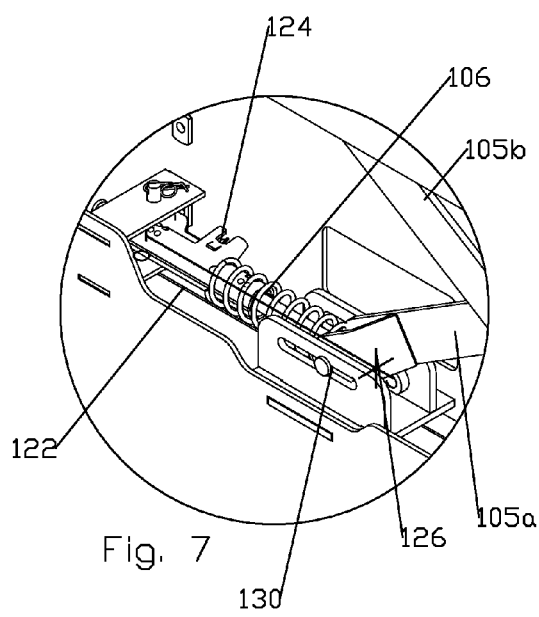

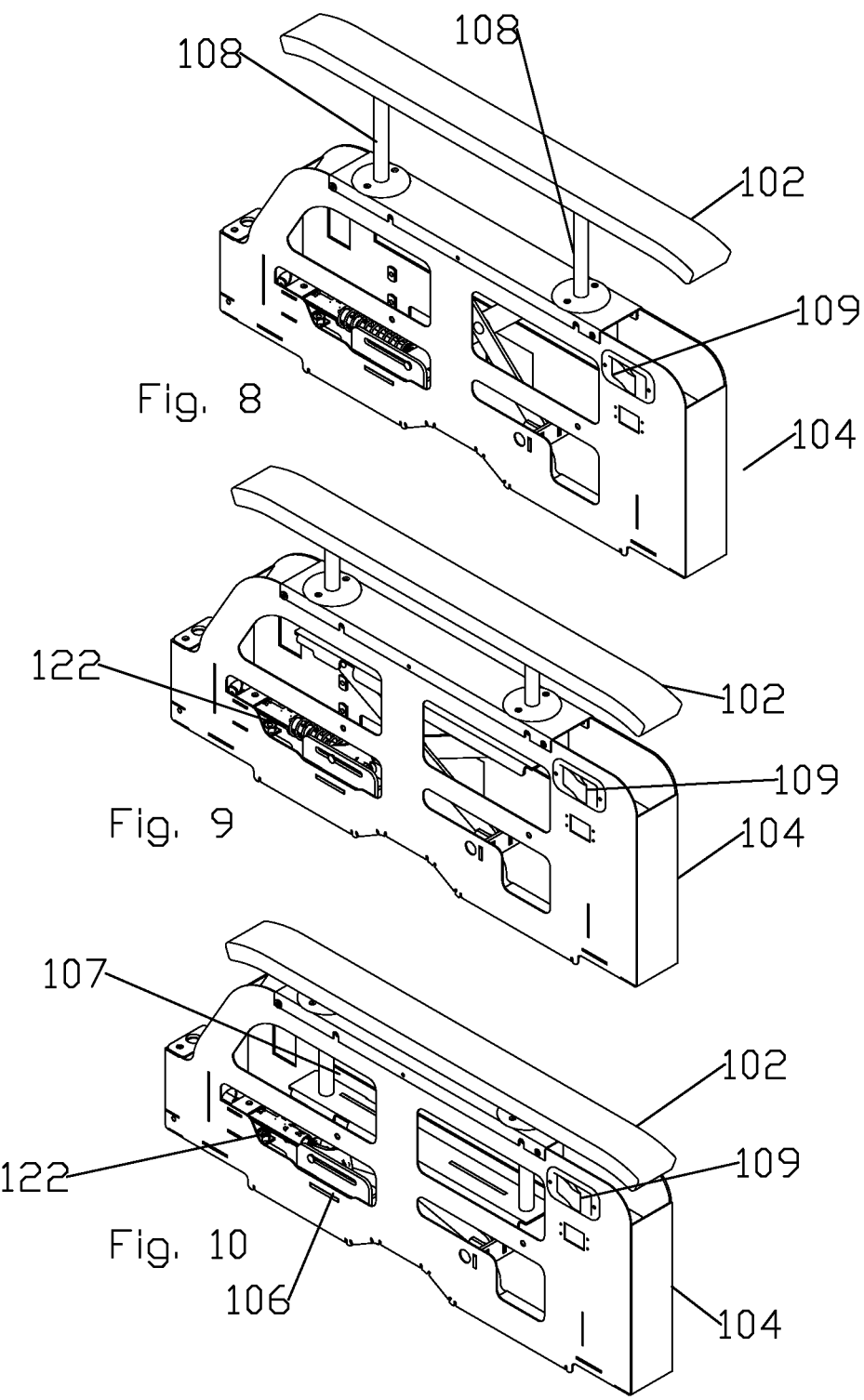

ADJUSTABLE TELESCOPING ARM

CLAIM OF PRIORITY

This application claims priority based on U.S. Provisional Application Ser. No. 61/558,809.

BACKGROUND OF THE INVENTION

Sitting chairs, chairs in motor vehicles, medical transfer chairs, hospital beds, etc., are heretofore known in the art to include arms or arm rests attached thereto. Such arms can be used by a person sitting on the chair to rest his or her arms thereon. At times, these arms can become problematic if, for example, their height restricts sideways movement of the person sitting on the chair. For example, in the medical field, a person sitting on a chair with arms may need to be moved from the chair and the person may not be in a condition to accomplish such movement on his or her own. In such a situation, the person may need to be pushed or slid off of the chair but due to the presence of arms on the chair, sliding or pushing the person off of the chair may not be possible. A second example, seating in a vehicle, could prevent the typical rotating arm, which a telescoping stub could be used and afford adequate ingress and egress.

SUMMARY OF THE INVENTION

In an aspect, the present disclosure provides for an adjustable telescoping arm (hereinafter "ATA") that can be attached to a sitting chair, a medical transfer chair, a motor vehicle chair, a hospital bed, or the like. The ATA provides a user with the ability to lower or raise the ATA. For example, in accordance with the ATA disclosed herein, a user could lower the ATA to a point at or below the seating surface of a chair. By lowering the ATA below the seating surface of the chair, ingress and/or egress of a person to be seated or removed from the chair becomes readily possible without interference by the arm of the ATA. In another example, the arm could be lowered to a position that remains above the seating surface but is still sufficiently low to allow ingress and egress.

In certain situations, the person sitting in the chair, or laying in a bed, may be unconscious or unable to move from the chair or bed under his or her own abilities. Under these circumstances, it may be necessary for a user to assist the person out of the chair or bed. In other situations, a person who is unconscious or immobile may need to be seated in a chair or bed and may need assistance from others to accomplish this goal. In the foregoing situations, a chair or bed equipped with the presently disclosed ATA would be ideal in that the ATA can be lowered to a position below the seating surface of the chair whereby interference from the ATA will be non-existent. Once seated, an operator can raise the ATA to a suitable height and the ATA can be locked in place so further movement thereof is not possible. In an example such as vehicle seating, the occupant may be unconstrained physically, but nevertheless utilize reduced arm height for ease of ingress and egress. Another advantage to a telescoping arm is the reduction or elimination of significant moving components external to the mechanism or upholstery.

Thus, there is easy adjustment from up to down position, the adjustable telescoping arm allows occupant to adjust overall height to the comfort of the user, there is a scissors linkage controlled with floating pivot that is compact and can be enclosed.

BRIEF DESCRIPTION OF THE DRAWINGS

FIG. 1 is a side view of the adjustable telescoping arm in its full up position.

FIG. 1a is a side view of an embodiment having mirror image linear actuators.

FIG. 2 is a side view of the adjustable telescoping arm in its mid-travel position.

FIG. 3 is a side view of the adjustable telescoping arm in its full down position.

FIG. 4 is an elevated side view of the adjustable telescoping arm in its full up position.

FIG. 5 is an elevated side view of the adjustable telescoping arm in its mid-travel position.

FIG. 6 is an elevated side view of the adjustable telescoping arm in its full down position.

FIG. 7 is an enlarged elevated side view of the linear actuator in the mid-travel position of FIG. 5.

FIG. 8 is an elevated side view of an embodiment of the adjustable telescoping arm in its full up position.

FIG. 9 is an elevated side view of an embodiment of the adjustable telescoping arm in its mid-travel position.

FIG. 10 is an elevated side view of an embodiment of the adjustable telescoping arm in its full down position.

DETAILED DESCRIPTION

In certain aspects, the Adjustable Telescoping Arm ("ATA") 100 is equipped with a vertical adjustment mechanism 112 that can be easily operated by a user, caregiver or other operator. The vertical adjustment mechanism can be locked whereby the ATA 100 becomes stationary or immobile. Also, the vertical adjustment mechanism 112 can be unlocked, thereby providing a user with the ability to raise or lower the ATA 100.

In accordance with this disclosure, the ATA 100 can also include a pad (not shown in the drawings) attached to a top side thereof to provide comfort to an arm that is resting thereon. The ATA can also provide an adjuster 113 to adjust the height of the arm 102 at infinite points between the full up and full down positions of the ATA. The arm pad and/or the portion of the ATA which comes into contact with a user's arm, e.g. the arm 102 of the ATA, can be composed of many suitable materials, such as wood, steel, urethane, fabric, or the like, although the structural arm 102 is advantageously formed from metal, such as steel, or other structural metal.

In an aspect, the vertical adjustment mechanism 112 can include a scissors-type linkage 114 controlled with a floating pivot 103. The vertical adjustment mechanism 114 can be included in a housing 104 and the housing can be attached to any type of seat or seating apparatus. For example, the housing 104 can be attached to the side of a medical transfer chair or a medical bed. In certain aspects, two housings can be used, each enclosing a vertical adjustment mechanism 112. One of the housings can be attached to a left side of the seating apparatus and the other housing can be attached to the right side of the seating apparatus.

As can be seen in the drawing figures, the housing 104 is shown enclosing the vertical adjustment mechanism 112 and an arm 102 of the ATA is shown rising above the vertical adjustment mechanism 112. While it is shown in each of the drawing figures, the housing 104 is not a required feature of the present disclosure and the ATA is fully operational and useful without a housing. The scissor-type linkage is shown having two rectangular members 105a, 105b in a cross-like pattern. One end of a first rectangular member 105a is pivotally affixed to an upper pivot arm plate 116 and the opposite end of the rectangular member 105a is affixed to a lower section of the housing 104. Second rectangular member 105b is slidably and pivotally affixed to an upper pivot arm plate 118 engaging a slot with a pin. By attaching the rectangular members in this fashion, they form a cross or x-shaped pattern. At the point where the rectangular members 105a, 105b intersect or the point in the center of the "x" formed by the rectangular members, floating pivot 103 can placed which penetrates both members and connects them pivotally together. The pivot 103 can be a pin, tube, or the like, which permits the arm of the ATA to be raised or lowered.

In certain aspects, one of the lower ends of the rectangular members 105a, 105b can be attached to a spring mechanism 106 which allows movement of this lower end. The spring mechanism 106 can be biased in a manner whereby extension of the spring pushes the lower moveable end of the rectangular member 105a towards the lower end of the other rectangular member 105b, thereby causing the pivot 103 to rise, which, in turn, causes the upper plates 116, 118 and thence arm 102 of the ATA 100 to rise. When the spring is fully extended, the arm of the ATA 100 is in its full up position.

Conversely, the spring 106 can be contracted by, for example, pushing downward on the arm 102 of the ATA 100, which would cause the pivot 103 to be lowered and the moveable lower end of the rectangular member 105 a to translate away from the lower end of the other rectangular member 105b which is pivoted, but not in a fixed position. When the spring 106 is fully contracted, the arm 102 of the ATA 100 would be in its full down position. As previously mentioned, the full down position can place the arm of the ATA 100 in a location below, equal height with, or slightly above the seating surface of a chair, bed or seat, whereby a person can be slid into or out of the chair or bed without interference from the arm of the ATA 100 or with minimal limitation on ingress and egress.

Moreover, the vertical adjustment mechanism 112 can be equipped with a locking mechanism 120. This locking mechanism allows the arm of the ATA 100 to become stationary in a particular desired position. For example, when the spring is contracted and the arm of the ATA 100 is below the seating surface of a chair, the locking mechanism is engaged and the arm will lock and become stationary below the seating surface. When appropriate, the locking mechanism 120 can be released and the height of the arm can be raised. As the arm 102 is rising, the locking mechanism 120 is disengaged, but can be engaged at any time to stop the vertical movement of the arm and hold the arm at a particular height. If the locking mechanism 120 is not actuated, the spring will cause the arm of the ATA 100 to rise to its full up position.

The locking mechanism can include a release lever 109, which will be accessible by a user. If the locking mechanism is covered by a housing, upholstery, etc., the release lever 109 can protrude out of the housing or upholstery such that a user can activate the lever 109. The release lever 109 can be connected by a cable 160 (shown in FIG. 1, FIG. 2 and FIG. 3 but not shown in the other figures) to a linear actuator 122 and/or an actuator pin 124. When the release lever 109 is activated, it releases a lock in the linear actuator 122, thereby allowing movement of the components of the ATA 100, such as the spring mechanism 106, the rectangular members 105a, 105b, the horizontal platform member 107, the vertical support members 108, and the arm 102 of the ATA 100. When the lever 109 is re-activated, the linear actuator 122 once again becomes locked, thereby preventing movement of the components of the ATA 100. Locking of the linear actuator can be accomplished through the use of an actuator pin 124, which can protrude through the linear actuator, thereby restricting its movement. While the linear actuator can be a linear recliner, as shown in the drawings, other actuators can be used, such as gas/spring actuators, or any other developed locking mechanisms known in the art.

While the drawings show an embodiment including one lower, moveable end 126 of a rectangular member 105b and one spring, it is contemplated that both lower ends of each rectangular member can be moveable in connection with springs. In this embodiment it will be understood that the linear actuator and slidable, pivotal connection will be a mirror image of that shown. This is shown in FIG. 1a with complementary linear actuators 122a and 122b and slotted, pivotal plates 118a and 118b. End 126 can be formed in a manner of a fork receiving a pin 130 which pin slides in a slot, thereby providing controlled horizontal movement which, operating through linkage 114, raises or lowers arm 102.

In an aspect of this disclosure, the upper ends of each rectangular member can be affixed to a horizontal platform member 107 that interconnects plates 116, 118. Vertical support members 108 can be attached to an upper surface of the platform member 107 and rise from the upper surface. This provides a more rigid structure permitting improved vectoring of raising and lowering forces. If the vertical adjustment mechanism is inside a housing 104, the vertical support members 108 can rise out of the housing by placing appropriate openings in the top portion of the housing. The arm 102 of the ATA 100 can then be affixed to the vertical support members 108. In such a configuration, when the locking member is released, the lower moveable end of the rectangular member will be pushed horizontally by the spring 106, causing the pivot and the upper ends of the rectangular members 105a 105b to rise, which, in turn, will cause the horizontal platform, vertical support members, and the arm of the ATA 100 to rise. Conversely, if the locking member is released and the arm of the ATA 100 is in its full up position, downward force can be placed on the arm of the ATA 100, causing it, as well as the vertical support members 108, horizontal platform 107, upper ends of the rectangular members 105a, 105b, and the pivot 103, to be lowered. Such downward pressure will also cause the spring 106 associated with a lower moveable end 126 of the rectangular member 105a to become compressed.

The elements included in the vertical adjustment mechanism 120 can be made of various metals, such as steel, aluminum, titanium, and the like, in sheet or other form.

The embodiment shown in FIG. 8, FIG. 9 and FIG. 10 demonstrates the adaptability of the linkage 114 in that it can be adapted to a housing 104 being horizontally shorter and vertically deeper, while having an arm 102 that is also longitudinally shorter.

While certain features and functions have been described with respect to the ATA 100, various modifications may become apparent to those skilled in the art which do not depart from the spirit and scope of the present disclosure and such modifications are intended to be covered herein.

In accordance with the invention, applicant claims:
1. An adjustable telescoping arm comprising:
an arm adapted to be raised, lowered or fixed;
a release and adjustment mechanism;
a scissors linkage formed of a first rectangular member having upper and lower ends, and a second rectangular member having upper and lower ends, said first and second rectangular members being pivotally connected to one another in a cross-like pattern;
said upper end of said first rectangular member is pivotally connected to an arm assembly, and said lower end of said first rectangular member is slidably and pivotally connected to a linear actuator proximate a lower section of the housing, whereby horizontal movement of said linear actuator imparts vertical movement of said arm assembly, wherein said upper end of said second rectangular member is slidably and pivotally affixed to said arm assembly and said second end of said second rectangular member is pivotally affixed to a lower section of the housing, wherein said lower end of the first rectangular member is attached to a spring mechanism, said spring mechanism being biased in manner wherein extension of the spring urges said lower end of said first rectangular member towards said lower end of said second rectangular member, thereby imparting vertical movement of said arm assembly, wherein said lower end of said second rectangular member is slidably and pivotally attached to a second linear actuator and operatively connected to a second spring such that said second linear actuator and said second spring coact with said first linear actuator and first spring to horizontally move said lower end of said second rectangular member.

2. The adjustable telescoping arm of claim 1, wherein said arm is operatively connected in an arm assembly comprising said arm, a vertical support member and a horizontal platform member, said upper ends being operatively connected to said horizontal platform member such that said arm assembly moves vertically as a unit.

3. The adjustable telescoping arm of claim 1, wherein said spring is compressed by pushing downward on said arm assembly, which causes the center pivot to be lowered and said lower end of said first rectangular member to slide away from said lower end of said second rectangular member.

4. The adjustable telescoping arm of claim 3, wherein when said spring is substantially fully extended, said arm is in a full up position.

5. The adjustable telescoping arm of claim 3 wherein when the spring is fully compressed, said arm is in a substantially full down position.

6. The adjustable telescoping arm of claim 5, wherein said substantially full down position places the arm a location adequate to allow side egress and ingress, so that a person can be slid into or out of the seating apparatus without interference from said arm.

7. The adjustable telescoping arm of claim 3, wherein the release and adjustment mechanism is equipped with a lock which allows said arm to become stationary in a particular desired position.

8. The adjustable telescoping arm of claim 7, wherein when the locking mechanism is engaged, vertical movements of the arm are stopped, and the arm is held at a particular height.

9. The adjustable telescoping arm of claim 8, wherein the locking mechanism comprises a release lever accessible by a user.

10. An adjustable telescoping arm comprising:
an arm adapted to be raised, lowered or fixed;
a release and adjustment mechanism;
a scissors linkage formed of a first rectangular member having upper and lower ends, and a second rectangular member having upper and lower ends, said first and second rectangular members being pivotally connected to one another in a cross-like pattern;
said upper end of said first rectangular member is pivotally connected to an arm assembly, and said lower end of said first rectangular member is slidably and pivotally connected to a linear actuator proximate a lower section of the housing, whereby horizontal movement of said linear actuator imparts vertical movement of said arm assembly,
wherein said upper end of said second rectangular member is slidably and pivotally affixed to said arm assembly and said second end of said second rectangular member is pivotally affixed to a lower section of the housing, wherein said lower end of the first rectangular member is attached to a spring mechanism, said spring mechanism being biased in manner wherein extension of the spring urges said lower end of said first rectangular member towards said lower end of said second rectangular member, thereby imparting vertical movement of said arm assembly, wherein said spring is compressed by pushing downward on said arm assembly, which causes the center pivot to be lowered and said lower end of said first rectangular member to slide away from said lower end of said second rectangular member, wherein the release and adjustment mechanism is equipped with a lock which allows said arm to become stationary in a particular desired position, wherein when the locking mechanism is engaged, vertical movements of the arm are stopped, and the arm is held at a particular height, wherein the locking mechanism comprises a release lever accessible by a user, wherein when said release lever is activated, it releases a lock operatively connected with said linear actuator and allows movement of said spring, said first and second rectangular members, said arm assembly, and when said release lever is re-activated, said linear actuator becomes locked, preventing movement of said spring, said rectangular members and said arm assembly.

11. An adjustable telescoping arm comprising:
an arm adapted to be raised, lowered or fixed;
a release and adjustment mechanism;
a scissors linkage formed of a first rectangular member having upper and lower ends, and a second rectangular member having upper and lower ends, said first and second rectangular members being pivotally connected to one another in a cross-like pattern;
said upper end of said first rectangular member is pivotally connected to an arm assembly, and said lower end of said first rectangular member is slidably and pivotally connected to a linear actuator proximate the lower section of the housing, whereby horizontal movement of said linear actuator imparts vertical movement of said arm assembly;
said upper end of said second rectangular member is slidably and pivotally affixed to said arm assembly and said second end of said second rectangular member is pivotally affixed to a lower section of the housing;
said lower end of the first rectangular member is attached to a spring mechanism, said spring mechanism being biased in manner wherein extension of the spring urges said lower end of said first rectangular member towards said lower end of said second rectangular member, thereby imparting vertical movement of said arm assembly;
said arm is operatively connected in an arm assembly comprising said arm, a vertical support member and a horizontal platform member, said upper ends being operatively connected to said horizontal platform member such that said arm assembly moves vertically as a unit;
said spring is compressed by pushing downward on said arm assembly, which causes the center pivot to be lowered and said lower end of said first rectangular member to slide away from said lower end of said second rectangular member;
when said spring is substantially fully extended, said arm is in a full up position;

when said spring is fully compressed, said arm is in a substantially-full down position;

said substantially full down position places the arm a location adequate to allow side egress and ingress, so that a person can be slid into or out of the seating apparatus without interference from said arm;

said release and adjustment mechanism is equipped with a lock which allows said arm to become stationary in a particular desired position, such that when the locking mechanism is engaged, vertical movements of the arm are stopped, and the arm is held at a particular height and when a release lever is activated, it releases said lock;

said lock being operatively connected with said linear actuator and allows movement of said spring, said first and second rectangular members, said arm assembly;

when said release lever is re-activated, said linear actuator becomes locked, preventing movement of said spring, said rectangular members and said arm assembly.

12. An adjustable telescoping arm comprising:

an arm assembly formed of an arm supported by a plurality of vertical support members, said vertical support members projecting from a horizontal member;

said horizontal member having a first end and a second end with a first pivot located at said first end and a second slidable pivot located at said second end;

a generally cross shaped scissors mechanism formed of a first rectangular member and a second rectangular member, said first member having a first end and a second end, said second member having a first end and a second end whereby said first end of said first member is pivotally connected to said first pivot and said first end of said second member is slidably and pivotally connected to said slidable pivot;

said first member and said second member are centrally pivotally connected to one another at a third pivot;

said second end of said first member is slidably and pivotally connected at a fourth pivot to a spring operated linear actuator mounted in a housing proximate the bottom of said housing and said second end of said second member is pivotally mounted to a fifth pivot proximate the bottom of said housing and displaced from said linear actuator;

an release and adjustment mechanism is equipped with a lock which allows said arm to become stationary in a particular desired position, such that when the locking mechanism is engaged, vertical movements of the arm are stopped, and the arm is held at a particular height and when a release lever is activated, it releases said lock;

said lock being operatively connected with said linear actuator and allows movement of said spring, said first and second rectangular members, said arm assembly;

when said release lever is re-activated, said linear actuator becomes locked, preventing movement of said spring, said rectangular members and said arm assembly.

13. The adjustable telescoping arm of claim 12, further comprising: said first pivot is a slidable pivot: said fifth pivot is a slidable pivot.

* * * * *